Jan. 5, 1965  M. J. HAWKINS  3,164,085
MECHANICAL LINKAGES TO ELECTRO-MAGNETS AND SOLENOIDS
CONTROLLING PRINT HAMMER MECHANISMS
Filed Dec. 10, 1962
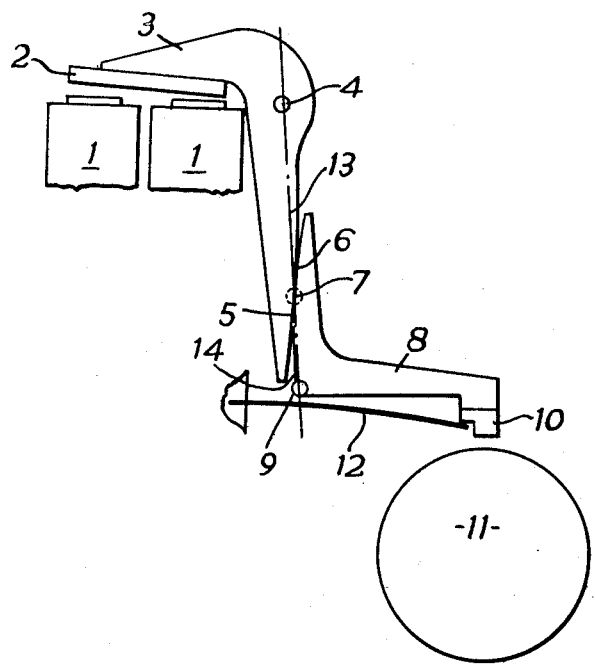
INVENTOR
MARCUS J. HAWKINS
BY
ATTORNEY

United States Patent Office 3,164,085
Patented Jan. 5, 1965

3,164,085
MECHANICAL LINKAGES TO ELECTRO-MAGNETS AND SOLENOIDS CONTROLLING PRINT HAMMER MECHANISMS
Marcus J. Hawkins, Farnborough, England, assignor to The Solartron Electronic Group Limited, Farnborough, England
Filed Dec. 10, 1962, Ser. No. 243,279
Claims priority, application Great Britain, Dec. 20, 1961, 45,682/61
7 Claims. (Cl. 101—93)

The invention relates to mechanical linkage coupled between an armature of an electro-magnet or solenoid and mechanism which is to be operated by the electro-magnet or solenoid.

A disadvantage of magnetic attraction as a source of mechanical power is that the force acting on the armature varies inversely with a function of the stroke of the armature, the particular function depending on the particular design. By stroke of the armature is means the distance moved by the armature from its position of rest when the electro-magnet or solenoid is unenergised. The force is therefore least at the start of the stroke when the armature is at its farthest point from the electro-magnet or solenoid but it is at this stage that the greatest force is usually required in order to overcome the high initial inertia of the linkage and the attached mechanism.

A further disadvantage of electro-magnets and solenoids, especially in small rapidly operating mechanism which reverse direction, is that the armature must necessarily be of large mass and inertia and may have the largest inertia in the system.

It is an object of the invention to provide an electro-magnet or solenoid with a mechanical linkage such that the force of the resultant stroke of the linkage does not vary as does that of the armature.

A further object of the invention is to provide an electro-magnet and linkage such that the kinetic energy gained by the armature can be almost completely transferred to the mechanism at the appropriate operating point, and also at this point the inertia of the armature, referred to the mechanism, can be negligible.

The present invention provides an electro-magnet or solenoid having an armature mechanically coupled to mechanism by a linkage comprising two members with touching surfaces which roll against each other substantially without sliding as movement is transmitted from the armature to the mechanism, the surfaces being so shaped that the mechanical advantage from the armature to the mechanism decreases as the armature moves further towards or into the electro-magnet or solenoid.

The two members can both be pivotally-mounted levers and will then be called rocking levers on account of the way in which they act against each other without sliding taking place. The condition that there should be no sliding movement is that the point of contact between the levers should always lie on the straight line joining the two pivots.

It is a known property of rocking levers that the mechanical advantage changes with change of displacement or stroke and it is possible to design for a wide range of laws relating mechanical advantage to stroke.

By this means, therefore, it can be arranged that the mechanical advantage of the linkage, referred to the armature, is greatest at the start of the stroke when the inertia of the linkage and the attached mechanism is highest and the magnetic force on the armature is least. At the end of the stroke however when the inertia is least and the magnetic force is greatest, the mechanical advantage of the linkage, referred to the armature, is least so a more constant force is obtained from the linkage.

By correct design of the curved surfaces and lengths of the levers, the linkage can, therefore, produce a force which is essentially constant throughout the stroke.

Similarly, at the end of the stroke, the inertia of the armature, referred to the attached mechanism, is least and since the mechanical advantage of the levers changes continuously as the stroke proceeds the kinetic energy gained by the armature is transferred almost completely to the attached mechanism.

An embodiment of the invention will be described, with reference to the accompanying drawing, as applied to a hammer used in a high speed printer in which the printing characters are formed by a hammer striking the paper and an inked ribbon against characters embossed on a continuously rotating print wheel. The drawing is a diagrammatic representation of an elevation of the hammer system showing the rocking levers.

An electro-magnet 1 in the form of two coils wound on soft iron cores act upon an armature 2 attached to one arm of a cranked lever 3 pivoted at 4. The other arm of the lever acts on an arm of another cranked lever 8 coplanar with the first lever 3, at a point 7 on curved surfaces 5 and 6 of the levers 3 and 8 respectively. The lever 8 is pivoted at 9 and the pivotal axes are parallel. When not actuated by the linkage the hammer 10 is held out of contact with the print wheel 11 by a leaf spring 12.

The point of contact 7 is distant "a" and "b" from pivots 9 and 4 respectively but although the point of contact 7 moves along the levers there is no sliding friction since it always lies on the line joining the pivots 4 and 9. The point of contact at the start and end of the stroke being at points 13 and 14 respectively on the curved surfaces.

In this system the time of contact of the hammer with the print wheel must be sufficiently short so that the motion of the print wheel produces negligible smudging of the character, but the time of contact must be long enough and the pressure high enough to give a reasonable print density. This condition is satisfied by design of the linkage and hammer to give the correct conditions of stroke and rebound of the hammer.

At the start of the stroke the mechanical advantage $(a/b)$ of the armature over the hammer is greatest. As the stroke proceeds and the magnetic force increases the mechanical advantage decreases because the point 7 moves towards the pivot 9, giving an almost complete transference of kinetic energy from the armature to the hammer. At the end of the stroke the velocity ratio of the levers $(b/a)$ is such that the armature inertia has very little effect upon the hammer. Thus at the critical rebound period the only inertia to be considered is that of the second lever and the hammer attached.

The rebound of the hammer returns a considerable part of original kinetic energy to the hammer. The mass of the second lever and hammer are so distributed that the majority of the energy of the rebound is absorbed in vibration but sufficient angular velocity is returned to ensure that the hammer does not hit the print wheel twice.

In order to achieve the required end-of-stroke velocity ratio and also to reduce the effects of friction the hammer lever pivot 9 must be small in diameter. To reduce the load on this pivot the shape of the hammer lever is such that its centre of percussion is at the point of impact. There is then no load on the pivot due to the impact of the hammer with the print wheel.

I claim:
1. An electrically-operated print-hammer mechanism comprising in combination:
   an electro-magnetic device having an attracted armature;
   a print-hammer;
   a mechanical linkage coupling said armature to said print hammer, said linkage including a first pivotally-mounted lever carrying said armature and a second pivotally-mounted lever carrying the print hammer, the two said levers having touching surfaces shaped to roll against each other without sliding as movement is transmitted from said armature to said print-hammer, the point of contact between the said surfaces moving with attraction of the armature so as to decrease the mechanical advantage from the said armature of said print-hammer, the length of said first pivotally-mounted lever being such that when said armature is in its fully attracted position the point of contact between the touching surfaces of said lever is adjacent the pivot of said second lever.

2. An electrically-operated print-hammer mechanism as claimed in claim 1 and further including a spring bearing against said second pivotally mounted lever to retain said levers in contact with each other.

3. An electrically-operated print-hammer mechanism comprising in combination:
   an electro-magnetic device having an attracted armature;
   a print hammer;
   a mechanical linkage coupling said armature to said print-hammer;
   the said linkage including a first pivotally-mounted lever carrying said armature, and a second pivotally-mounted lever carrying said print-hammer, the two said levers having touching surfaces shaped to roll against each other without sliding as movement is transmitted from the armature to the print-hammer, the point of contact between the said surfaces always moving along a straight line joining the two pivots on attraction of the armature so as to reduce the mechanical advantage from the said armature to said print-hammer, the length of said first pivotally-mounted lever being such that when the armature is in an attracted position the point of contact between the two surfaces is adjacent the pivot of said second pivotally mounted lever.

4. An electrically-operated print-hammer mechanism as claimed in claim 3 and further including a spring bearing against said second pivotally-mounted lever to retain said levers in contact with each other.

5. An electrically-operated print-hammer mechanism as claimed in claim 4 wherein the shape of the touching surfaces of said two pivotally-mounted levers is such that on attraction of the armature a substantially constant torque is applied to said second pivotally-mounted lever.

6. Printing mechanism comprising:
   a rotary print wheel;
   a hammer for effecting printing against said wheel;
   an electro-magnetic actuator for said hammer, including an armature and a mechanical linkage coupling said armature to said hammer, said linkage including a first pivotally-mounted lever carrying the said armature, and a second pivotally-mounted lever carrying the said hammer, said two pivotally-mounted levers having touching surfaces in force transmitting relationship and which surfaces are shaped to roll without sliding as movement is transmitted from said armature to said hammer, the point of contact between the said surfaces moving, as said surfaces roll, so as to decrease the mechanical advantage from said armature to said hammer as said armature is attracted and the stroke thereof increases, the said point of contact always lying on a straight line joining the two pivots, the length of the first pivotally-mounted lever being such that when the stroke is a maximum the point of contact between the touching surfaces is adjacent the pivot of said second pivotally-mounted lever.

7. A printing mechanism as claimed in claim 6 and further including a spring bearing against said second pivotally-mounted lever to retain the second pivotally-mounted lever away from said printing wheel.

References Cited by the Examiner

UNITED STATES PATENTS

| 972,424 | 10/10 | Williams | 200—104.1 |
|---|---|---|---|
| 1,487,439 | 3/24 | Burnham | 317—165 X |
| 2,735,968 | 2/56 | Bogue | 317—198 |
| 2,805,620 | 9/57 | Rosen. | |
| 2,874,634 | 2/59 | Hense. | |
| 2,940,385 | 6/60 | House. | |
| 3,012,499 | 12/61 | Amada. | |
| 3,041,964 | 7/62 | Simpson et al. | |

FOREIGN PATENTS

| 1,111,622 | 3/56 | France. |
|---|---|---|

WILLIAM B. PENN, *Primary Examiner.*